Patented Apr. 8, 1924.

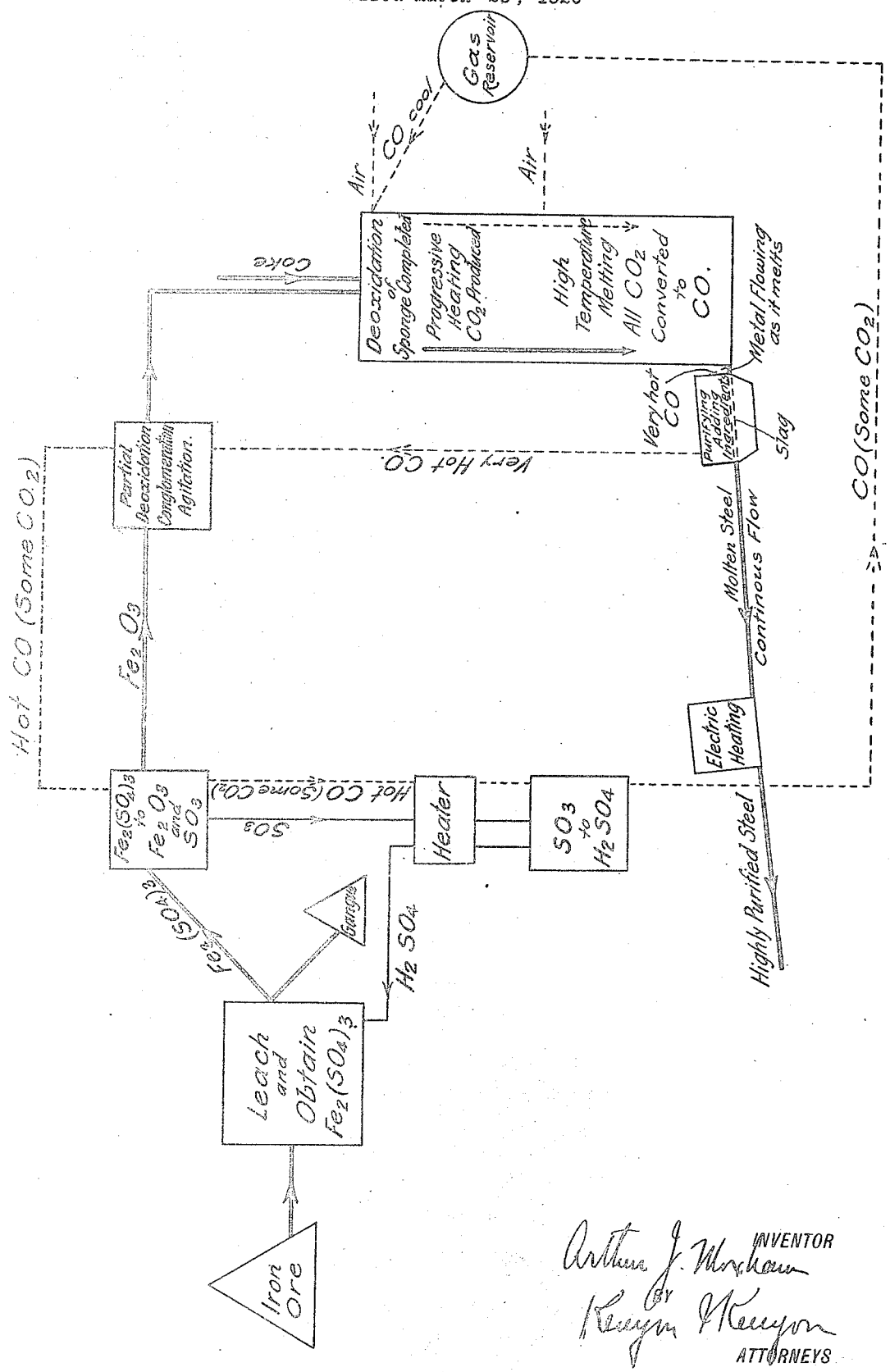

1,489,361

UNITED STATES PATENT OFFICE.

ARTHUR J. MOXHAM, OF GREAT NECK, NEW YORK, ASSIGNOR, BY MESNE ASSIGNMENTS, TO J. P. LAFFEY, TRUSTEE, OF WILMINGTON, DELAWARE.

PRODUCTION OF IRON AND STEEL.

Application filed March 26, 1920. Serial No. 368,859.

*To all whom it may concern:*

Be it known that I, ARTHUR J. MOXHAM, a subject of the King of Great Britain, and a resident of Great Neck, in the county of Nassau and State of New York, have invented new and useful Improvements in the Production of Iron and Steel, of which the following is a specification.

My invention relates to the production of iron and steel, and has for its general object the provision of a more economical and uniformly efficient method for obtaining iron and steel of the desired quality and composition, and especially the very highest grades of steel, by operations conducted on a large scale.

To this end I have invented a complete process which includes every essential step beginning with the treatment of the iron ore and ending with highly purified steel of any desired composition. There are also involved in this invention novel sub-processes directed to the same general end and which I prefer to employ as parts of my complete process but which may with advantage be employed independently thereof. For the practice of my invention, I have also devised certain apparatus which will constitute the subject matter of one or more separate applications for Letters Patent and which is not illustrated or described in detail in the present application, but only in such general manner as will best aid an understanding of my process and its several advantages.

My complete process generally described includes the leaching of iron ore with a suitable acid, preferably sulfuric acid, whereby the iron in the ore becomes a salt in solution such as ferric sulfate, the separation of the solution from the gangue, the conversion of ferric sulfate or other iron salt to an oxid of iron, preferably ferric oxid, and the subsequent reduction and purification of the ferric oxid or other oxids of iron and the addition to the iron of such ingredients as may be needed to secure the desired reactions or as may be desired in the final product in the case of ferro alloys.

Both the process as a whole and the several steps thereof have been devised with specific purposes in mind, which will appear in connection with the description herein of one specific embodiment of my invention, but among which may be mentioned the saving of heat energy, the production of a higher grade of steel than has heretofore been possible when made uniformly and by large scale operations, and the conservation for re-use in the most economical manner of re-agents employed in carrying on the process. The economy of heat energy is obtained by my process (1) because I avoid the necessity of bringing to a high heat the silica and other impurities of the ore, the heating of fluxes therefor, and the melting of a large quantity of slag, and its removal from the molten steel, (2) because I utilize the heat energy in such manner that progressive changes of the material necessary to its reduction and purification are accomplished at temperatures and under conditions most practical for efficient action, whereby the material need not be maintained at higher temperatures as long as would otherwise be the case or maintained at lower temperatures an unduly long time, (3) because I am able to conserve to a high degree the heat energy developed at certain stages of the process for use at other stages thereof, and (4) because I am able to recover from the smelting operation a much larger portion of deoxidizing and combustible gas than is the case in known smelting operations. The uniform production in large quantities of a superior high grade steel is made possible in my process because little or no slag becomes mixed with the molten metal and because in the relatively low temperature steps of the process the iron is so far purified that the reactions occurring at the relatively high temperature steps are simpler and more quickly accomplished than is the case when a number of re-actions at the same stage of the operation must be depended upon, as in the case of refining at these high temperatures. The avoidance of the waste of re-agents is effected in my process largely because I employ re-agents which may be readily re-formed and then used again, instead of being practically consumed as, for example, is the case when fluxing the impurities of the ore with limestone in a blast furnace.

The drawing accompanying this application is a diagram of the several steps of the complete process, showing the successive stages in the treatment of the iron containing material, the recovery of the leaching acid and the circulation and utilization of the gases.

I shall describe my invention on the assumption that the more usual iron ores are to be employed, namely: ores in which the iron is in the form of an oxid, but in any case silica and other impurities in the accompanying gangue constitute a considerable portion of the ore. The first step, after preferably crushing the ore to a suitable fineness and the elimination of the adherent clay or dirt in any suitable way, is to subject large bodies of the ore to the action of a suitable acid of suitable strength and under such conditions as will most efficiently convert the iron in the ore to a salt carried in solution. I prefer to use sulfuric acid for this purpose, because I desire to convert the iron to ferric sulfate which may be economically decomposed by suitably applied heat into ferric oxid, suitable for reduction and refining, and sulfur trioxid gas, suitable for the commercial production of sulfuric acid for the leaching of fresh ore.

I prefer to employ the specific process of leaching with sulfuric acid invented by Albert W. Davison, which process will constitute the subject matter of an application for Letters Patent of the United States by him. In accordance with that process, the ore is leached in sulfuric acid of such specific gravity and at such temperature as to maintain the ferric sulfate in solution until after the solution is entirely separated from the gangue. The gangue should also be washed sufficiently to recover in solution all of the ferric sulfate formed in the leaching process in concentrated form. The ferric sulfate so reclaimed from the gangue is then crystallized from the solution.

In the diagram I have indicated at the left a body of iron ore and that it is brought to the leaching apparatus. I have indicated, by the first square at the left, the treatment of the iron ore thus far described, whereby its iron is converted into ferric sulfate [$Fe_2(SO_4)_3$] and separated from the other impurities contained in the ore that are insoluble in sulfuric acid. At this point the gangue is separated out and I have no further interest in it, so far as my present process is concerned. The diagram shows that the ferric sulfate is carried forward to the next stage of the process, which comprises the conversion of the ferric sulfate into iron oxid, preferably ferric oxid ($Fe_2O_3$). It is preferable that this decomposition, whether complete or partial, should take place as a separate operation, rather than to introduce the sulfate into the same furnace as the one where the melting of the iron occurs, even though this furnace may be depended on to complete or make perfect the final deoxidation. In my process, therefore, the next stage of the operation is, as indicated in the diagram, to convert the ferric sulfate into ferric oxid ($Fe_2O_3$) and, to effect this, I prefer to adopt the method which will also be described in the aforesaid Davison application, to wit: The decomposing of the ferric sulfate by the direct application of heated gases while the particles of the sulfate are thoroughly agitated as, for example, by the employment of the well-known Wedge furnace, to ensure the rapid and effective application of heat throughout the ferric sulfate. It has been found that no interference of any kind occurs with this action, if hot carbon monoxid gas alone, or admixed with carbonic acid gas and nitrogen, is brought in direct contact with the particles of ferric sulfate. I have indicated in the diagram that at the stage of the process now under consideration hot carbon monoxid gas and the crystals of ferric sulfate are brought together and result in the decomposition of the ferric sulfate into ferric oxid and sulfur trioxid gas. The ferric oxid is in the form of a fine reddish powder and contains practically all the iron that was in the iron ore.

This ferric oxid is next, as indicated on the diagram, more or less deoxidized and considerably changed in its mechanical formation by being subjected to intimate contact with a hot reducing gas, preferably carbon monixid gas. If the gas at this point should sometimes happen to not be rich in carbon monoxid, it is only necessary to charge in and mix with the ferric oxid some powdered coke or other form of carbon—or other reducing agent. For this purpose, I again prefer to use the Wedge type of furnace so that the ferric oxid will be violently agitated and brought into the most intimate relation with the heated gas, whereby the rapidity of the action will be greatly increased. The gas should be of higher temperature than that employed in decomposing the ferric sulfate, but the deoxidation and the conglomeration of the more or less deoxidized material are affected both by temperature and duration of treatment, wherefore the temperature may vary considerably. Good results may be obtained with temperatures about 700° C. While a complete deoxidation of the ferric sulfate may be effected at this stage of my process, the degree of deoxidation effected at this stage is sometimes of less practical importance than the conglomeration of the material to the proper degree to permit of the easy passage of the gases used in the next stage of my process. Furthermore, the temperature at this stage of the process is relatively low and it will ordinarily be found more economical to eliminate the last of the oxygen from the iron oxid at the higher temperatures which are employed in the next stage of my process where this final deoxidation is performed efficiently and rapidly. On the other hand, if desired, the present stage of the process could be omitted entirely inasmuch as the next stage of the process, now to be described, is better adapted to operate efficiently upon fine powder than any existing process of iron reduction and melting, now known to me. I prefer, however, to employ the present stage of the process, as it permits the ready agitation of the finely divided ferric oxid and the consequent efficient action thereon of a gaseous deoxidizer, such as carbon monoxid.

In this subsequent stage deoxidation of the more or less deoxidized iron is completed, the iron melted, and carbon monoxid produced. This is accomplished by mixing the more or less deoxidized iron obtained in the preceding stage of the process with carbon preferably in the form of powdered coke in proper proportions to produce the desired results, the mixture being fed to the upper end of a column of said materials and materials produced therefrom and acted upon to produce the desired deoxidation, melting and production of carbon monoxid as the iron containing material or iron and carbon pass downwardly through the column. This stage of the process may be carried on in a furnace which is generally similar to the ordinary iron cupola but which is arranged to have the down-draft now to be described. Air and a reducing gas, such as carbon monoxid, are delivered to the upper part of the column, as shown in connection with the rectangle at the right hand end of the diagram, and forced downwardly through the column of material, thereby establishing at the upper end of the column a zone in which the more or less deoxidized iron continues to be deoxidized to iron by the carbon monoxid and in which carbon dioxid is produced. The air admitted at the top of the column is preferably just sufficient to combine with the carbon to produce the heat needed for the deoxidizing reaction. The temperature in this zone gradually increases from the top of the column downward to perhaps a temperature of 700° to 800° C. but no melting occurs in this zone.

Below the deoxidizing zone, the iron produced in the said zone, still mixed with carbon, that has not been used up in the upper zone, is subjected to a much higher temperature to melt the same. This iron melting zone is established by forcing downwardly through the column of material from a point between the deoxidizing and melting zones a suitable quantity of air for an effective combustion of the carbon to develop the desired high temperature. At this high temperature, such carbon dioxid as may exist in the iron melting zone is converted by combination with incandescent carbon into carbon monoxid.

It will be noted that in this stage of my process all of the air and gases are forced downward toward the melting zone; so that the material acted upon is effectively carried to this zone and danger of blowing the material out of the upper end of the column and thereby wasting it is avoided, this being especially important if it is introduced to the cupola in a finely divided or powdered state. This method is accordingly, as heretofore stated, especially well adapted to operate efficiently upon fine powder, such as the ferric oxide produced as described above. This stage of my process is one capable of advantageous use in connection with manufactures other than that of iron and steel, both because of the advantage that the draft tends to bring all materials towards the melting or most highly heated zone and because it effectively converts carbon dioxid gas into carbon monoxid gas, the production of which gas is highly useful in the practice not only of my process but also for other commercial processes and purposes.

The iron now containing some carbon, as shown by the heavy line and small rectangle at the lower right hand side of the diagram, flows as it melts into a suitable refining hearth where it is purified and where suitable ingredients are, if desired, added to produce a steel of any desired composition. The melted iron is maintained in this refining hearth in a fluid condition.

The temperature of the molten bath in the refining hearth preferably corresponds approximately to such temperatures as are reached in openhearth furnaces towards the end of the melt, but will vary according to the character and quality of steel that is to be produced in the refining hearth. This in turn may depend upon whether the steel produced in the refining hearth is to be used without further refining or change, or whether, prior to casting, it is to be subjected to further refining at a higher temperature, as hereinafter described.

It is always possible by increasing the amount of coke in the cupola and the amount of air forced into its lower zone to increase the temperature of the refining hearth containing the molten metal.

At this stage of the process, any method of treatment for purifying or adding ingredients known to steel makers, including especially those employed in the openhearth process may be used. The iron entering the refining hearth will contain carbon preferably in excess of that desired in the final steel and the bath is partially decarbonized in the refining hearth. For this purpose I prefer to employ some of the powdered ferric oxid produced at the earlier stage of the process, or else depend upon a basic lining in the refining hearth, or both.

Suitable heat for the material in the refining hearth may be provided in any suitable way, but I prefer to direct the very hot carbon monoxide gas produced in the preceding stage of my process into the hearth above the molten bath, as indicated by the dotted line in the diagram. If a temperature higher than the sensible temperature of this gas is desired, air may be introduced into the refining hearth so that a part of the carbon monoxide may be burned as the gas passes through the refining hearth to produce the additional heat required. The method of reducing the iron oxide and refining the metal described above is more efficient than those now employed. In the latter methods, the purification is largely a matter of batch action in which the elimination of the whole of a given impurity is effected at nearly the same time throughout the whole charge. In my process, various actions are taking place simultaneously throughout different parts of the material being treated. While iron oxide is being reduced at one point, and iron is being melted and carbonized at another, the melted metal flows very slowly, in small particles or even in drops, into the purifying forehearth. Here it reaches a mass of the purifying agent, and during a large part of the operation it also meets a large mass of metal already purified.

The purification of the metal entering the refining hearth is practically instantaneous because of the fact that it enters continuously in minute streams or drops which immediately react with the layer of slag in the refining hearth. In this refining hearth the metal is collected until there is sufficient for an ordinary casting operation, or for removal to the electric furnace if it is to be further refined. In either case, it is a matter of choice whether when the metal is poured from the refining hearth it is first emptied completely or, instead, left therein as a nucleus for collection of the next batch. Because of the fact that during the collection of the molten metal in the refining hearth the purification is taking place continuously in the small quantities flowing into the hearth, ample notice is given of any adverse conditions and, therefore, there is ample time to remedy them. Thus, if an analysis should show a small rise of some impurity in the molten bath, it becomes evident that a much more impure metal has been entering the bath and that some operating conditions must be changed, although the impure metal has been so diluted that as yet no substantial harm to the metal as a whole has been done.

Furthermore the reversible reactions commonly encountered are obviated, and the reactions are more stable than heretofore. The final purifying actions are continuous and a number of different actions are simultaneously taking place.

My process is also one of increased efficiency in operation and in the resulting product, because of the small amount of slag produced at any stage of the process, owing to the very complete separation of the silica and gangue and also of the manner by which whatever slag is found becomes later separated from the metal bath by settlement. The extent to which the particles of slag included within the steel affects the quality of the steel has become better understood within recent years, and steel makers have been giving greater attention than heretofore to the removal so far as possible of every particle of slag from the molten bath before casting the metal. The removal of the slag, however, from a large batch of molten metal is extremely difficult requiring that the bath be maintained at a high temperature for a long period of time. In my process a very small amount of slag is formed because of the fact that the usual impurities of the iron ore have been largely removed, particularly the silica. Practically the only silica present is that derived from the silicates in the coke and these can be kept at a minimum by proper washing of the coal previous to the coking operation. The small quantity of slag produced is, moreover, formed in such manner that it is readily separated from the metal as it enters the forehearth. The materials melting in the bottom of the cupola drops in tiny streams, or even drops, to the floor of the cupola and then pass to the bath of molten metal in the forehearth so that the very minute quantities of slag that accompany such drops of metal easily separate therefrom and have no tendency to become mixed with the bath of molten metal. Moreover, the relatively large mass of molten metal in the forehearth is maintained hot for a considerable period by the gases facilitating the further separation of the heavy metal from the lighter slag.

The production of steel with practically no slag is an important result of my invention.

When the very highest grades of steel are desired, the molten steel is, with my process, then subjected to electric heating in order to give the molten bath the very high temperatures which are at present only obtainable in the electric furnace. The diagram indicates that after the purifying stage, the molten steel is subjected to electric heating. As the results generally obtained in an electric furnace are well known and the various methods of treatment therein known, I do not need to detail them, it being understood that the length of time during which the bath is subjected to this electric heat and the particular heat treatment therein must depend upon the exact character of steel desired, as well as upon the particular treatment which the steel has received in the forehearth. I call attention, however, to the fact that heating in an electric furnace is relatively expensive and that the length of time to which the metal must be subjected to this costly heat, in order that steel of some definite desired purity may be obtained, is dependent mainly upon the degree of previous purification of the steel and its temperature when it reaches the electric furnace. In the practice of my process, the steel will not only be molten when it reaches the electric furnace, but, for reasons above stated, it will be already so highly purified that it need be maintained only for a relatively short period in the electric furnace, in order to remove the last traces of undesired ingredients, particularly the sulphur, the slag and occluded gases. I therefore reduce the expensive electric heating to a minimum while obtaining a product of the very highest grade, and thus am enabled to effect a wider commercial employment of electric heating than has heretofore been possible, and a wider use of the very high grade steels.

As shown by the dotted line on the diagram, the very hot carbon monoxid from the melting zone, after passing through the purifying forehearth may be, and desirably is, employed as the reducing agent for the preliminary partial deoxidation of the ferric oxid. During this action, a part of the carbon monoxid is converted to carbon dioxid. The sensible heat of the remaining hot carbon monoxid (with the carbon dioxid) is then preferably employed to convert the ferric sulfate into ferric oxid and sulfur trioxid, as hereinbefore described. After this action, both the carbon monoxid (together with the carbon dioxid) as well as the sulfur trioxid have considerable sensible heat therein, and this may be utilized for any suitable purpose. In the diagram, I have shown all of these gases passing through a heater to heat the latter, and I have shown the heater utilized to heat the sulfuric acid to assist in bringing it to the desired temperature for leaching.

The sulfur trioxid produced as described above is converted into sulfuric acid, which after passing through the heater is used for leaching the ore, as shown by the light solid line in the diagram. For this purpose, the carbon monoxid, carbon dioxid, and sulfur trioxid from the heater may be passed through a suitable condenser, the sulfur trioxid being converted into sulfuric acid, which is condensed, and the other gases passing on and being desirably stored in a suitable reservoir, as shown. From this reservoir the gas, which has now become cool, may be drawn for use in the final deoxidation of the iron oxid. By my process, there is thus provided a continuous supply of reducing gas and the heat of the same is advantageously utilized.

Moreover, it should be noted that more or less rich gas (containing no carbon dioxid) is available and is regulated according to the need by the amount of coke charged and the amount of air supplied.

As the inert nitrogen carried into the system with the air accumulates, the gases should from time to time be allowed to escape to the air and a fresh supply of rich gas produced.

It is to be understood that the specific process described is merely illustrative of my invention, and that changes within the scope of the appended claims may be made without departing from the invention. For example, while the use of the down draft smelting operation herein described is a very important specific feature of my complete process, and is also useful independently thereof, yet my invention broadly considered includes the combination with other steps of my process of any known method for completely deoxidizing the iron oxide and melting the reduced iron.

Having described my invention, what I claim as new and desire to secure by Letters Patent, is:

1. The process of extracting iron from its ores which comprises treating the ore with an acid to dissolve the iron as an iron salt and separate it from the silicious portions of the ore, converting the separated iron salt into an iron oxid, and reducing the iron oxid.

2. The process of extracting iron from its ores which comprises treating the iron ore to convert the iron therein to ferric sulfate and separate it from the silicious ingredients of the ore, converting the ferric sulfate to an iron oxid and then reducing the oxid.

3. The method of producing iron which consists in first treating a silicious mineral containing iron with sulfuric acid to produce sulphate of iron in solution, separating the solution from the undissolved matter, then acting upon the salt to again produce an iron oxid, and then reducing the oxid by smelting operations.

4. The process of producing iron from iron ores which includes first acting upon the iron ore to convert the iron therein to a salt in solution, then separating the solution from the undissolved portion of the ore, then acting upon the salt to again produce iron oxid, and then reducing the oxid by smelting operations.

5. The process of producing iron from silicious minerals containing ferric oxid which includes first acting upon the mineral to produce ferric sulphate in solution, then separating the solution from the undissolved matter, then decomposing the ferric sulphate by heat to again produce ferric oxid, and then reducing the oxid by smelting operations.

6. The process of producing iron from iron ores which includes first treating the ore with sulfuric acid to produce ferric sulphate in solution, then separating the solution from the undissolved matter, then dehydrating the ferric sulphate, then calcining the ferric sulphate to decompose it and produce ferric oxid, and then reducing the oxid by smelting operations.

7. The process of extracting iron from its ores which comprises leaching the ore with sulfuric acid to produce a solution of ferric sulfate, separating the solution from the undissolved part of the gangue, converting the ferric sulfate to iron oxid, partially deoxidizing the iron oxid with a gaseous reducing agent while agitating the oxid to facilitate the action of the reducing agent thereon until a suitable partially deoxidized iron sponge is produced and thereafter further deoxidizing the iron sponge without agitation and at a materially higher temperature.

8. The process of extracting iron from its ores which comprises treating the ore to convert the iron therein into ferric sulfate and to separate it from the silicious materials of the ore, then converting the ferric sulfate to iron oxid, then partially reducing and conglomerating the iron oxid, then mixing the conglomerated material with carbon and completing its deoxidation in the presence of a reducing gas and with partial combustion of the carbon, then melting the iron with further combustion of the carbon, then collecting the metal as it melts to form a bath continuously subjected to heat, and treating the bath with suitable agents to produce iron or steel of a desired composition.

9. The process for obtaining iron or steel from iron ores comprising converting the iron contents of the ore into ferric sulfate and separating it from the silicious contents of the ore, then converting the ferric sulfate into an iron oxid powder, then agitating this powder in the presence of a stream of hot carbon monoxid to conglomerate and partially deoxidize it, then mixing the conglomerated material with carbon and completing its deoxidation in the presence of a reducing gas and with partial combustion of the carbon, then melting the iron with further combustion of the carbon, and then collecting the metal as it melts to form a bath continuously subjected to heat, and treating the bath with suitable agents to produce iron or steel of a desired composition.

10. The process for obtaining iron or steel from iron ores comprising converting the iron contents of the ore into ferric sulfate and separating it from the silicious contents of the ore, then converting the ferric sulfate to an iron oxid, then more or less deoxidizing the iron oxid, with carbon monoxid, then mixing the material thus produced with carbon and adding the mixture to the top of a column of material, the upper part of which is subjected to a downward draft of carbon monoxid gas and sufficient air to produce a progressive heating and the lower part of which is subjected also to a further down draft of sufficient air to effect a melting temperature, collecting the metal as it melts in a bath subjected to the heated gas issuing from below the melting zone of the column, and suitably treating the molten bath.

11. The process for obtaining iron or steel from iron ores comprising converting the iron contents of the ore into ferric sulfate and separating it from the silicious contents of the ore, then converting the ferric sulfate into an iron oxide powder, then agitating this powder in the presence of a stream of a deoxidizing medium to conglomerate and partially deoxidize the iron oxid, then mixing the conglomerated material with carbon and adding the mixture to the top of a column of material, the upper part of which is subjected to a downward draft of carbon monoxid gas and sufficient air to produce a progressive heating below melting temperature and the lower part of which is subjected also to a down draft of sufficient air to effect a melting temperature, collecting the metal as it melts in a bath subjected to the heated gases issuing from the melting zone of the column, suitably treating the molten bath, and finally subjecting the molten metal to electric heating.

12. The process which comprises conglomerating and partially deoxidizing an iron oxid with a gaseous deoxidizing agent while agitating the oxid to facilitate the action of the deoxidizing agent thereon, and thereafter further deoxidizing the conglomerated material at a materially higher temperature produced by combustion in the mass of said material.

13. The process which comprises converting the iron of iron ore to iron oxid in the form of a fine powder, partially deoxidizing the iron oxid powder with a gaseous deoxidizing agent while agitating the oxid to facilitate the action of the deoxidizing agent thereon, and thereafter further deoxidizing the material at a materially higher temperature produced by combustion in the mass of said material.

14. The process which comprises conglomerating and partially deoxidizing an iron oxid with a gaseous deoxidizing agent, heat for the partial deoxidation being supplied by the sensible heat of deoxidizing agent, and thereafter further deoxidizing the conglomerated material with the application of heat obtained by combustion of carbon.

15. The process which comprises feeding a mass of material including an iron oxid in a given direction into a melting zone, and forcing a deoxidizing gas into the mass at a point remote to the melting zone and leading the gas away after it has passed through said melting zone.

16. The process which comprises forcing a deoxidizing gas downward through a column of iron containing material including an iron oxid to establish an upper zone for deoxidizing the iron oxid, establishing below said zone a zone for melting the deoxidized material, and leading the gas away after it has passed downwardly through said melting zone.

17. The process which comprises forcing a gas comprising carbon monoxid into a column of iron containing material including an iron oxid to deoxidize the iron oxid and convert carbon monoxid to carbon dioxid, adding air to the column to form an iron melting zone, reconverting the carbon dioxid to carbon monoxid, and leading the carbon monoxid away after it emerges from the melting zone.

18. The process which comprises forcing carbon monoxid and air in regulated proportions into the upper portion of a column of iron containing material including an iron oxid and carbon to establish an upper zone for deoxidizing iron oxid, admitting air at a lower level to form a melting zone below said upper zone, reconverting to carbon monoxid in said melting zone carbon dioxid produced above said melting zone, and leading the carbon monoxid away after it emerges from said melting zone.

19. The process which comprises establishing a column of iron containing material and progressively increasing the temperature thereof from the top, forcing a current of deoxidizing gas downward through the column to deoxidize the iron oxid, melting the deoxidized iron, deoxidizing the oxidized gas, collecting the metal as it melts to form a bath, and purifying the molten bath while subjecting it for a suitable period of time to the heat of said deoxidizied gas.

20. The process which comprises establishing a column of iron containing material and progressively increasing the temperature thereof from the top, forcing a current of deoxidizing gas downward through the column to deoxidize the iron oxid, melting the deoxidized iron, deoxidizing the oxidized gas, collecting the metal as it melts to form a bath, purifying the molten bath while subjecting it for a suitable period of time to the heat of said deoxidized gas, and further purifying the molten bath by means of electrically generated heat.

21. The process which comprises establishing a column of iron containing material and progressively increasing the temperature thereof from the top, forcing a current of deoxidizing gas downward through the column to deoxidize the iron oxid, melting the deoxidized iron, deoxidizing the oxidized gas, collecting the metal as it melts to form a bath, and purifying the molten bath and adding suitable ingredients thereto to produce a steel of desired composition while subjecting the bath for a suitable period of time to the heat of said deoxidized gas.

22. The process which comprises forcing a gas comprising carbon monoxid into a column of iron containing material including an iron oxid to deoxidize the iron oxid and convert carbon monoxid to carbon dioxid, adding air to the column to form an iron melting zone, reconverting the carbon dioxid to carbon monoxid, leading the carbon monoxid away after it emerges from the melting zone, and causing the same to act upon an iron oxid to more or less reduce the same prior to further deoxidation thereof in the column.

23. The process of extracting iron from its ore which comprises leaching iron ore with sulfuric acid to produce a solution of ferric sulfate, separating the solution from the gangue, converting the ferric sulfate to an iron oxid, forcing carbon monoxid and air in regulated proportions through a column of material including the iron oxid and carbon to deoxidize said oxid and melt the deoxidized iron, and utilizing the sensible heat of the gas resulting from said operation to convert the ferric sulfate to ferric oxid.

24. The process of extracting iron from its ores which comprises leaching iron ore with sulfuric acid to produce a solution of ferric sulfate, separating the solution from the gangue, converting the ferric sulfate to ferric oxid and sulfur trioxid by the application of heat, and heating the sulfuric acid by the sulfur trioxid.

25. The process for obtaining iron or steel which comprises partially deoxidizing and conglomerating ferric oxid, then mixing the material with carbon and further deoxidizing it in the presence of a deoxidizing gas and with partial combustion of carbon, then melting the iron by further combustion of the carbon and producing hot carbon monoxid gas, and then collecting the metal as it melts to form a bath subjected to the hot carbon monoxid gas, the carbon monoxid after its action on the bath being utilized to effect the first mentioned deoxidation of the ferric oxid.

26. The process of extracting iron from its ores which comprises obtaining ferric sulfate by treatment of the ore, then converting the ferric sulfate into an iron oxid, then partially deoxidizing and conglomerating the iron oxid, then mixing the conglomerated material with carbon and further deoxidizing it in the presence of a neutral gas and with partial combustion of the carbon, then melting the iron by further combustion of the carbon and producing hot carbon monoxid gas, and utilizing the hot carbon monoxid gas to effect the first mentioned deoxidation of the iron oxid, the sensible heat then left in the gas being utilized to convert the ferric sulfate to an iron oxid.

27. The process of extracting iron from its ores which comprises obtaining ferric sulfate by treatment of the ore, then converting the ferric sulfate into ferric oxid, then partially deoxidizing and conglomerating the ferric oxid, then mixing the conglomerated material with carbon and further deoxidizing it in the presence of a deoxidizing gas and with partial combustion of carbon, then melting the iron by further combustion of carbon and producing hot carbon monoxid gas, and then collecting the metal as it melts to form a bath subjected to the hot carbon monoxid, the carbon monoxid after its action on the bath being utilized to effect the hereinbefore mentioned partial deoxidation of the ferric oxid and the gases from such partial deoxidation being utilized to convert the ferric sulfate to ferric oxid and thereafter being delivered to the mixture of conglomerated material and carbon for the above described further deoxidation of said material.

28. The process of extracting iron from its ores which comprises treating the ore to convert the iron therein into ferric sulfate and separate it from materials of the ore that are insoluble in sulfuric acid, then converting the ferric sulfate to ferric oxid, reducing the latter, melting the iron, and collecting it as it melts to form a bath continuously subjected to heat and wherein the metal is purified.

29. The process of extracting iron from its ores which comprises treating the ore to convert the iron therein to an iron sulfate and separate it from the materials of the ore that are insoluble in sulfuric acid, converting the iron sulfate to an iron oxid, deoxidizing the oxid, melting the deoxidized iron, and purifying the iron as it melts while collecting it to form a bath continuously subjected to heat.

In testimony whereof, I have signed my name to this specification.

ARTHUR J. MOXHAM.